(12) United States Patent
Milender et al.

(10) Patent No.: US 7,643,133 B2
(45) Date of Patent: Jan. 5, 2010

(54) AIR CARGO POWER DRIVE UNIT FOR DETECTING MOTION OF AN OVERLYING CARGO CONTAINER

(75) Inventors: Jeffrey Steven Milender, Valley City, ND (US); William Richard Ockert, Cathay, ND (US); Adam Edmund Buckhouse, Fargo, ND (US)

(73) Assignee: Goodrich Corporation, Charlotte, NC (US)

( * ) Notice: Subject to any disclaimer, the term of this patent is extended or adjusted under 35 U.S.C. 154(b) by 568 days.

(21) Appl. No.: 11/469,643

(22) Filed: Sep. 1, 2006

(65) Prior Publication Data

US 2008/0078867 A1    Apr. 3, 2008

(51) Int. Cl.
*G01C 3/08* (2006.01)
*B64C 1/22* (2006.01)

(52) U.S. Cl. .................. 356/5.05; 244/137.1; 356/445; 356/614

(58) Field of Classification Search .............. 244/118.1; 250/339.11, 341.8; 324/158.1, 753; 356/51, 356/445, 482, 486, 498, 614, 500, 5.05; 318/490
See application file for complete search history.

(56) References Cited

U.S. PATENT DOCUMENTS

| | | | |
|---|---|---|---|
| 3,859,519 A | 1/1975 | Weischedel | |
| 4,101,831 A * | 7/1978 | Dumbeck | .................. 324/166 |
| 4,121,709 A | 10/1978 | Bebhardt | |
| 4,880,304 A | 11/1989 | Jaeb et al. | |
| 4,970,384 A | 11/1990 | Kambe et al. | |
| 5,186,417 A | 2/1993 | Pritchard | |
| 5,213,201 A | 5/1993 | Huber et al. | |
| 5,318,167 A | 6/1994 | Bronson et al. | |
| 5,568,858 A | 10/1996 | Thompson | |
| 5,661,384 A | 8/1997 | Glibbery | |
| 5,716,028 A | 2/1998 | Evans et al. | |
| 5,749,543 A | 5/1998 | Huber | |
| 6,135,269 A | 10/2000 | Huber et al. | |
| 6,254,033 B1 | 7/2001 | Huber | |
| 6,328,154 B1 | 12/2001 | Huber | |

(Continued)

FOREIGN PATENT DOCUMENTS

EP    0769450    4/1997

(Continued)

OTHER PUBLICATIONS

Search Report, GB0716636.6 dated Jan. 3, 2008.

*Primary Examiner*—Tarifur Chowdhury
*Assistant Examiner*—Tara S Pajoohi
(74) *Attorney, Agent, or Firm*—Womble Carlyle (57) ABSTRACT

An air cargo power drive unit has a motor, at least one driver roller element coupled to said motor, a light source, a light detector, and a processor having memory associated therewith, said memory storing instructions. The device is configured to emit light from the light source, receive reflected light from the light detector when an air cargo is overhead, and convert the detected light into a time series of a digital samples representing a time-varying intensity of the received light. The processor then performs calculations on the digital samples to determine whether the unit load device is moving. This determination may be based, for instance, on spikes among the digital samples, and/or on first, second, or even higher-order, statistics of the detected samples.

28 Claims, 11 Drawing Sheets

U.S. PATENT DOCUMENTS

| | | |
|---|---|---|
| 6,420,846 B1 | 7/2002 | Wolfe |
| 6,433,329 B1 | 8/2002 | Butka et al. |
| 6,791,100 B2 | 9/2004 | Dye |
| 6,834,758 B2 | 12/2004 | Nguygen et al. |
| 6,855,933 B2 | 2/2005 | Stone et al. |
| 6,867,702 B2 | 3/2005 | Huber et al. |
| 6,871,823 B2 | 3/2005 | Roberts |
| 7,014,038 B2 | 3/2006 | Leingang et al. |
| 2006/0186271 A1 | 8/2006 | Jacobsen et al. |

FOREIGN PATENT DOCUMENTS

| | | |
|---|---|---|
| EP | 0926631 | 12/1998 |
| EP | 1695908 | 2/2006 |
| FR | 2762239 | 10/1998 |
| GB | 2433242 | 11/2006 |

* cited by examiner

AIR CARGO POWER DRIVE UNIT FOR DETECTING MOTION OF AN OVERLYING CARGO CONTAINER

FIELD OF THE INVENTION

One embodiment of the present invention is directed to a power drive unit for transporting cargo on an aircraft. More particularly, one embodiment of the present invention is directed to a power drive unit having the capability to detect the presence and motion of a cargo-carrying unit load device above the power drive unit.

BACKGROUND INFORMATION

A large variety of motorized systems for moving cargo are known. Motor driven rollers are typically employed in these systems. Cargo and passenger airplanes in particular often employ a series of motor driven power drive units ("PDU"s) to quickly and efficiently propel cargo containers and pallets, otherwise known as unit load devices ("ULD"s), within the aircraft cargo compartment. This configuration can allow for the transportation of cargo from the external loader to the interior of the airplane by one or more operators controlling the PDUs.

Cargo within an airplane cargo deck is typically supported by a system of freely rotating floor-mounted conveyance rollers. Sets or banks of PDUs can be simultaneously elevated from beneath the cargo deck to a level just above the conveyance rollers. Each PDU may be a separate electromechanical actuator which includes one or more rubber coated wheels or drive rollers. The drive rollers of the elevated PDUs contact and move cargo above the conveyance rollers in the commanded direction upon energization. The movement of cargo depends on the coefficient of friction between the PDU drive rollers and the bottom surface of the ULD, as well as the lifting force generated by the PDU lift mechanism. When the PDUs are deenergized, roller rotation ceases and the ULD stops moving.

Several sets of PDUs can be arranged along a common path of conveyance, and each set can be operated separately, thereby allowing for the transfer of multiple pieces of cargo. An operator supervising the transportation of cargo into the cargo deck area can guide cargo by means of a joystick and an on/off switch or similar controls.

PDUs can be damaged when they continue to operate beneath immobilized cargo, a condition known as scrubbing. Scrubbing occurs when cargo is too heavy or has come upon an obstruction such as a wall guide within the cargo compartment. Scrubbing can quickly wear away the rubber coating on the rollers (or the roller itself) necessitating their replacement and can result in damage to the PDU motor.

Cargo container stall sensors integrated within a PDU are used to sense a stalled container and to remove power to the PDU motor after a predetermined delay to avoid PDU damage. Some PDU control systems have a manual de-select switch for removing power to the PDUs when a stall condition is determined. Unfortunately, this de-select switch is often not used properly by operators, who are focused on loading cargo rather than protecting PDUs. Thus, damage to PDUs when scrubbing conditions occur is a common problem.

Known stall sensors include mechanisms for monitoring the temperature of the PDU motor, which is subject to measurement error, or require additional electromechanical mechanisms on the PDU, which are susceptible to wear and other maintenance issues.

Further, in the aircraft cargo area, it is important to keep track of the location of the ULDs. The most common method of keeping track of these ULDs, while they are in the cargo area, is by detecting them as they pass over a ULD sensor which is located on the floor of the cargo compartment. One known sensing method is the use of infrared (IR) light to determine the presence of the ULD. For instance, U.S. Pat. No. 5,661,384 discloses a PDU having an IR sensor to detect the presence of cargo directly above a corresponding PDU. U.S. Pat. No. 7,014,038 also discloses employing an IR or other sensor data to detect cargo. Such systems typically employ a digital sensor which only allows two states (i.e., "ULD present" or "ULD not present"). While prior art PDUs are configured to use IR information to detect an ULD, they are not configured to detect whether the ULD is moving.

SUMMARY OF THE INVENTION

In one aspect, the present invention is directed to a method of detecting motion of an unit load device in a cargo hold of an aircraft. The method includes providing a floor of the cargo hold of an aircraft with a power drive unit having a motor, at least one driver roller element coupled to said motor, a light source, a light detector, and a processor having a memory associated therewith for storing instructions. The method also includes emitting, with the light source, a plurality of pulses of light in a direction of an underside of an unit load device when an unit load device is over the power drive unit; detecting, with the light detector, light reflected from the underside of the unit load device; sampling the detected light to form a time series of digital samples, each digital sample representative of an intensity of reflected light; and performing calculations on a plurality of said digital samples to determine whether the unit load device is moving, wherein the calculations include at least one from the group consisting of: (a) determining the number of spikes among the digital samples; and (b) taking at least one statistic of the digital samples and comparing said at least one statistic with a corresponding at least one threshold.

In another aspect, the present invention is directed to an air cargo power drive unit. The unit comprises a motor, at least one driver roller element coupled to said motor, a light source, a light detector, and a processor having a memory associated therewith for storing instructions. When executed by said processor, the instructions cause the processor to: cause the light source to emit a plurality of pulses of light in a direction of an underside of an unit load device when an unit load device is over the power drive unit; obtain a time series of digital samples, each digital sample representative of an intensity of light reflected from an underside of an unit load device and detected by the light detector when an unit load device is over the power drive unit; and perform calculations on a plurality of said digital samples to determine whether the unit load device is moving. The calculations include at least one from the group consisting of: (a) determining the number of spikes among the digital samples; and (b) taking at least one statistic of the digital samples and comparing said at least one statistic with a corresponding at least one threshold.

yet another aspect, the present invention is directed to a cargo aircraft having an air cargo loading system including at least one power drive unit and unit load device overlying the power drive unit. The at least one power drive unit comprises: a motor, at least one driver roller element coupled to said motor, a light source, a light detector, and a processor having a memory associated therewith for storing instructions. When executed by the processor, the instructions cause the processor to cause the light source to emit a plurality of pulses of light in a direction of an underside of the unit load device; obtain a time series of digital samples, each digital sample representative of an intensity of light reflected from an underside of an unit load device and detected by the light detector; and perform calculations on a plurality of said digital samples to determine whether the unit load device is moving. The calculations include at least one from the group consisting of: (a) determining the number of spikes among the digital samples; and (b) taking at least one statistic of the digital samples and comparing said at least one statistic with a corresponding at least one threshold.

DETAILED DESCRIPTION

The contents of aforementioned U.S. Pat. Nos. 5,661,384, and 7,014,038 are incorporated by reference to the extent necessary to understand the present invention. In view of these references, one skilled in the art would know how to use an IR light source and an IR light detector to detect whether an ULD is present over a PDU.

Figure 1:
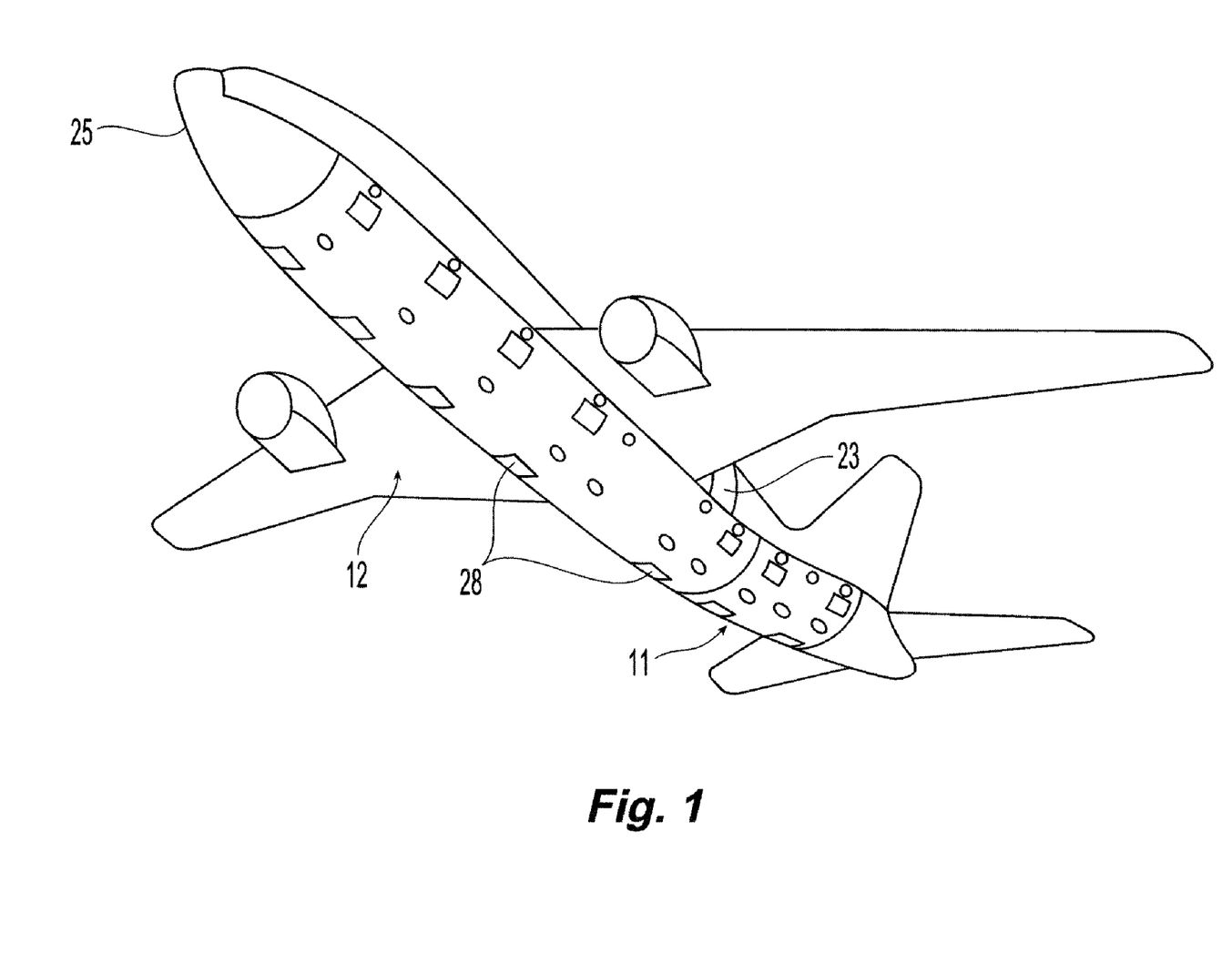
FIG. 1 illustrates the underside of an aircraft and FIG. 2 an aircraft cargo deck that can be used to implement an embodiment of the present invention.
Figure 2:
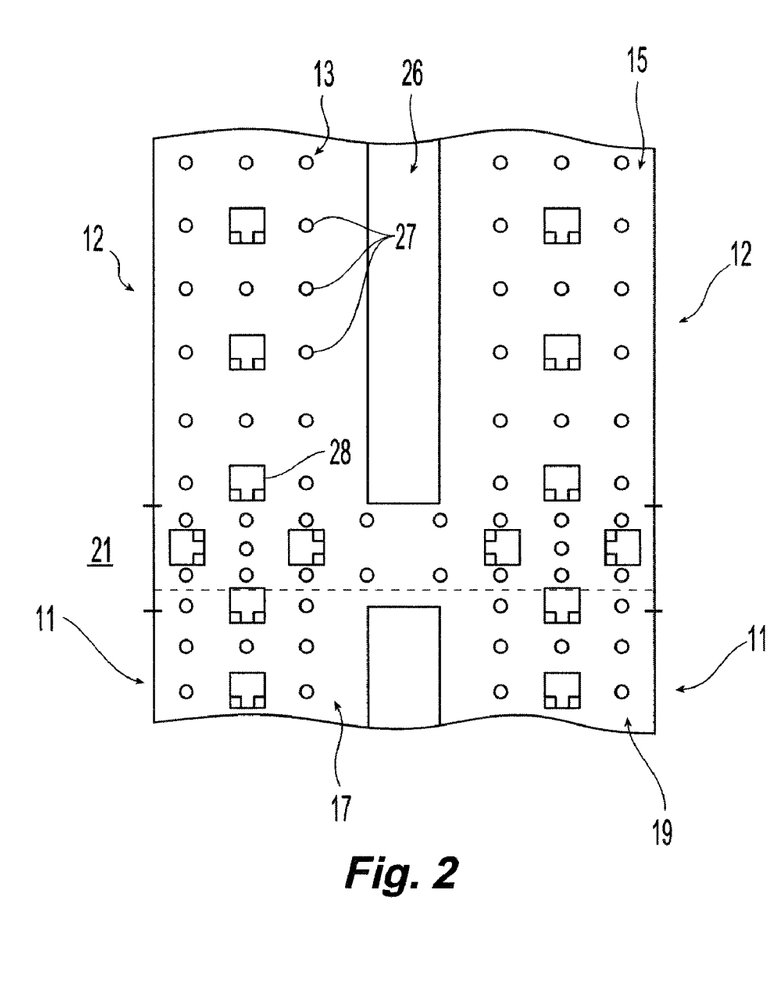

FIG. 1 illustrates the underside of an aircraft 25 and FIG. 2 an aircraft cargo deck 26 that can be used to implement an embodiment of the present invention. A generally H-shaped conveyance surface 26 forms a deck of an aircraft, adjacent a cargo bay loading door 23. However, there are many other aircraft cargo deck configurations to which the embodiments of the invention can be implemented. For example, some aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 2.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. To this end, the H-shaped cargo surface includes a number of PDUs 28, that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present invention, are above the conveyor plane all of the time and held up by a spring. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo door 23. This additional path 21 divides the cargo bay between the forward and aft sections 11 and 12. This path is used to move cargo into and out of the aircraft, and also to transfer cargo between the left and right storage tracks.

In one embodiment, a human operator manipulates control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand held pendant. These controls will typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. When the joystick is released, the selected set of PDUs is de-energized. In the case of self-lifting PDUs, the drive roller elements are returned to their retracted position below the plane of the conveyance rollers 27; in the case of spring-lift PDUs, the PDUs remain biased in the upward position and brakes are applied to hold the cargo containers in place. Control systems of this type are known in the art.

Figure 3:
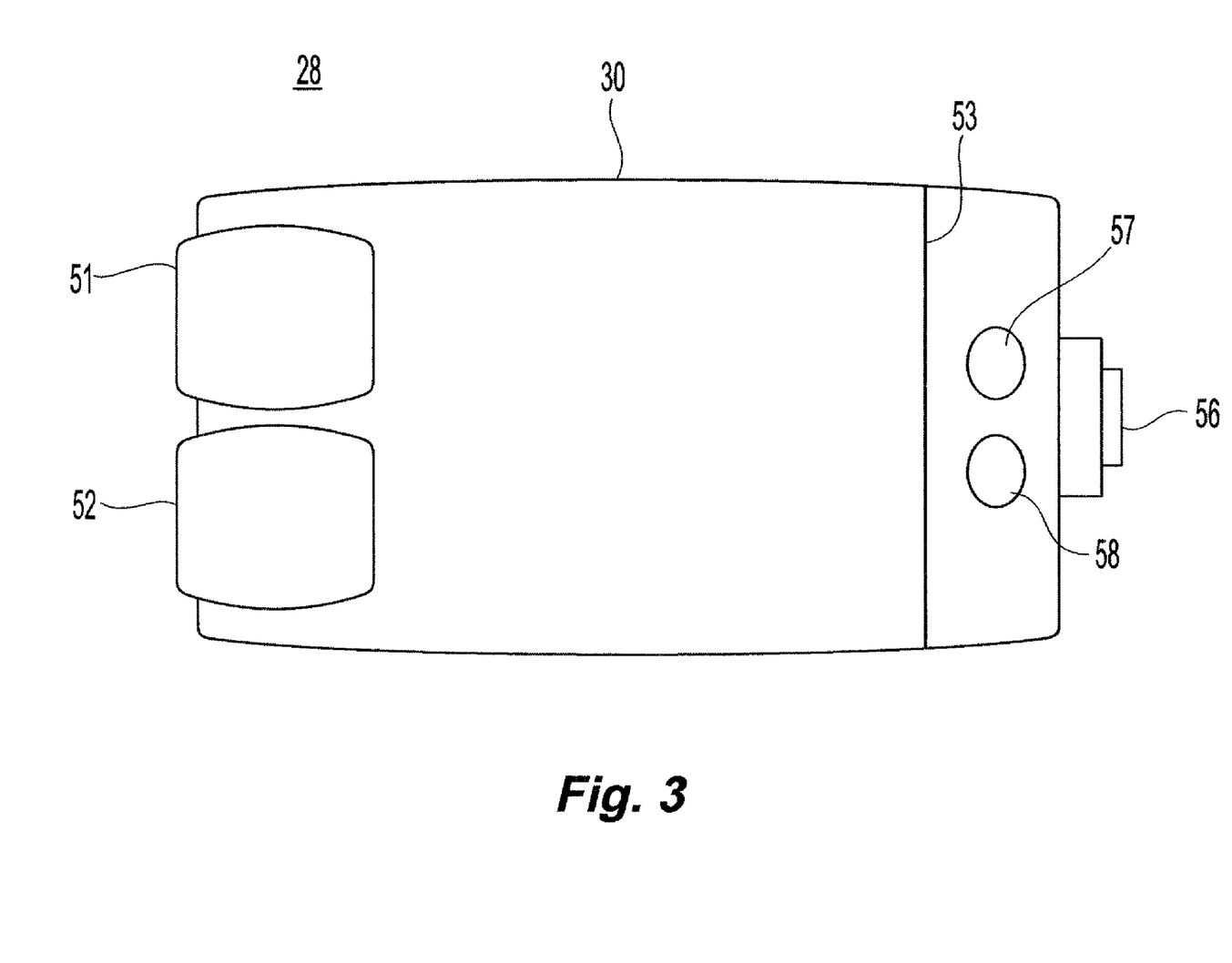
FIG. 3 is a top view of a PDU in accordance with one embodiment of the present invention.

FIG. 3 is a top view of a PDU 28 in accordance with one embodiment of the present invention. PDU 28 includes a housing 30 which incorporates a pair of wheels 51 and 52 that function as drive roller elements. Wheels 51 and 52 are coupled to a drive shaft (not shown). PDU 28 further includes necessary motor and gear assemblies and other necessary components (not shown) for turning and/or raising wheels 51 and 52 so that wheels 51 and 52 are positioned above the cargo deck and are able to contact the bottom of a ULD. PDU 28 further includes an electronics cavity that is separated from the rest of the PDU by a wall 53 for housing the necessary electronics (disclosed in more detail below), and includes an electrical connector 56 for coupling the electronics to a power and a control source. PDU 28 further includes a light source 57, such as an infrared light ("IR") transmitter having a light emitting diode ("LED"), for emitting infrared light. PDU 28 further includes a light detector 57, such as an IR receiver having a photo diode or photo transistor and perhaps other circuitry such as signal amplifiers, automatic gain control, bandpass filters and the like, for detecting the presence of infrared light. In other embodiments, other types of light besides IR can be used. It is understood by those having ordinary skill in the art that when the light source 57 emits light of a particular center wavelength (e.g., infrared), the light detector 58 will be selected based on its response characteristics in the relevant wavelength, and may be accompanied by appropriate optical filters, lenses and the like.

Figure 4:
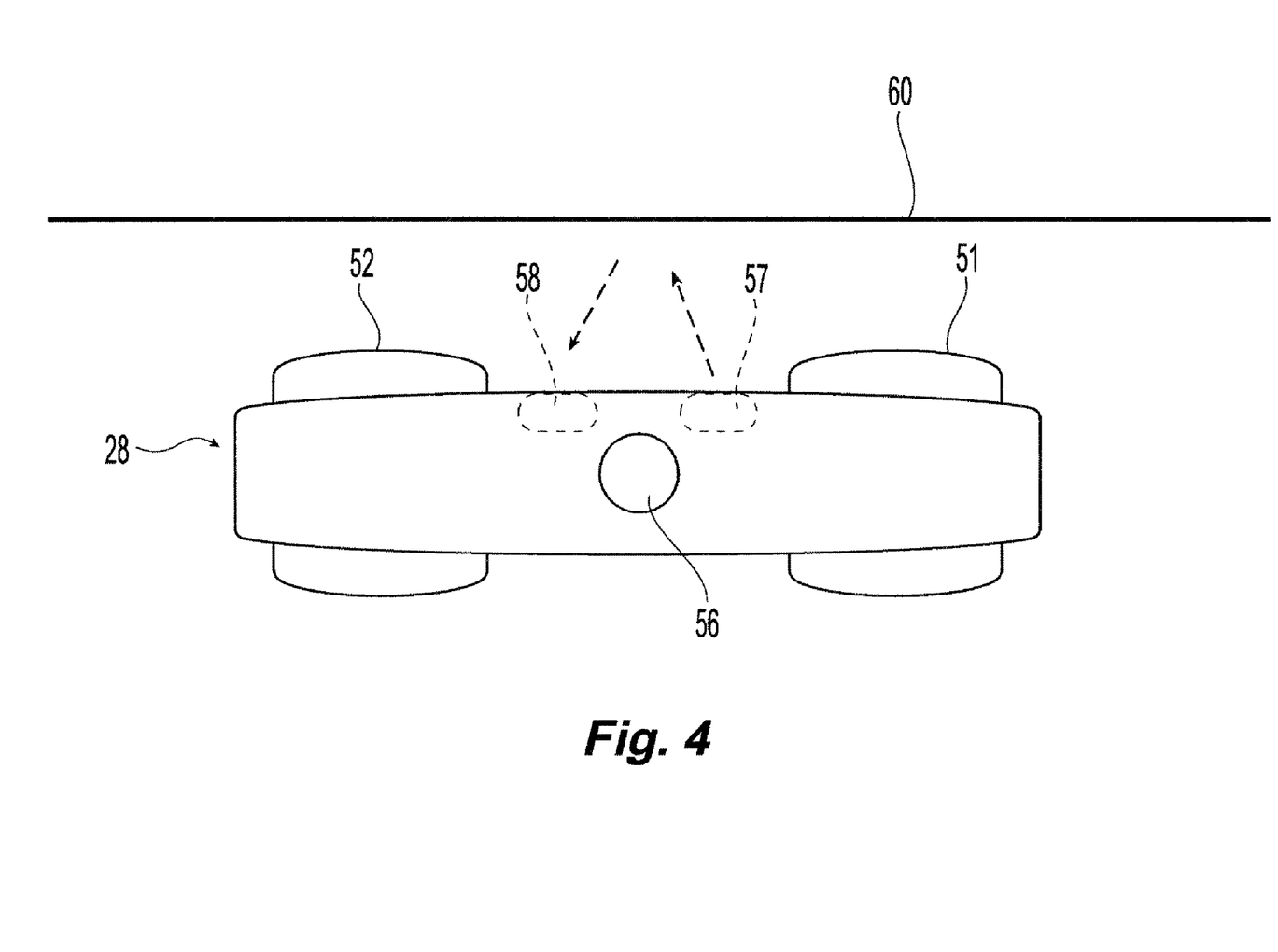
FIG. 4 is an end view of the PDU in accordance with one embodiment of the present invention.

FIG. 4 is an end view of PDU 28 in accordance with one embodiment of the present invention, and illustrates the relationship of PDU 28 with the bottom surface 60 of a ULD that is passing over and being propelled by PDU 28. The light source 57 emits light that bounces off the bottom surface 60 (assuming a ULD is present) and is reflected back to light detector 58 where it is processed by the electronics of PDU 28.

Figure 5:
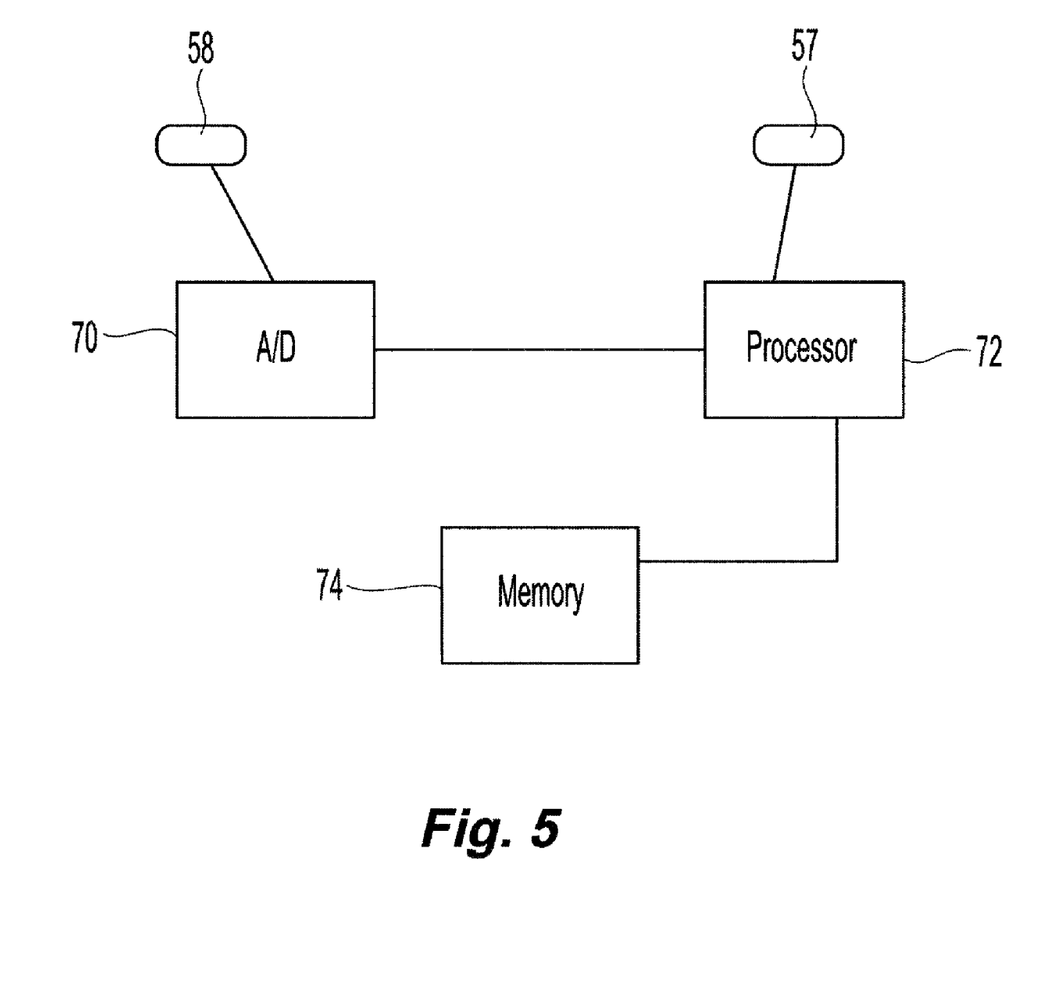
FIG. 5 is a block diagram of the electronics of the PDU in accordance with one embodiment of the present invention.

FIG. 5 is a block diagram of the ULD sensor and scrub sensor electronics of PDU 28 in accordance with one embodiment of the present invention. Coupled to light detector 58 is an analog to digital ("A/D") converter 70 that takes an analog input from the light detector 58 and converts it to a digital value representative of an instantaneous intensity of light. Coupled to A/D converter 70 is a processor 72 and memory 74. Processor 72 may be any type of general purpose processor, and memory 74 may be any type of storage device that stores instructions to be executed by processor 72. In one embodiment, processor 72 may include A/D converter 70 and/or memory 74. Light source 57 is coupled to an output pin of processor 72. In one embodiment, a power driver is included between processor 72 and the light source 57.

A processor-adjustable variable resistor may be coupled to processor 72 and light detector 58. The variable resistor is used to set the sensitivity of A/D converter 70, which selects the window of light that the sensor will measure (i.e., the minimum strength of light that will be detected and the greatest strength of light that can be measured before the A/D output reaches its maximum value).

In one embodiment, the A/D converter 70 is a 10-bit A/D converter, although A/D converters of other bit resolutions may be used instead. In one embodiment, the A/D converter 70 samples the time-varying light intensity at a rate of 200 samples/second, or at 5 msec intervals. Thus, for a one-quarter second pulse, a time series of 50 digital samples are taken, and these are provided to the processor 72 for further calculations. It is understood that not all 50 samples may be used due to start-up transients in the first few digital samples. It is further understood that other sampling rates may be used, depending on the A/D converter 70 and processor 72 speed.

Figure 6A:
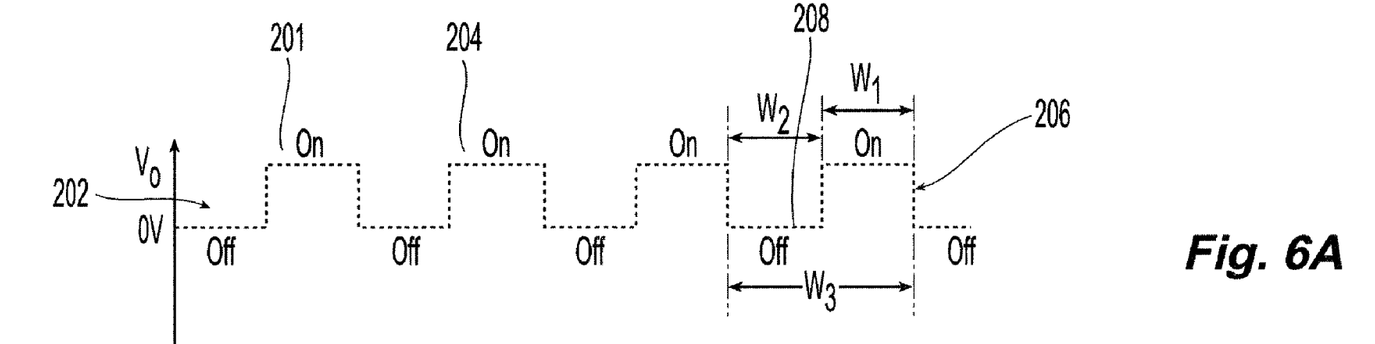
FIG. 6A shows an ideal waveform comprising a train of light pulses and FIG. 6B shows an ideal output for when no ULD covers the PDU.

FIG. 6A shows an example of an ideal output waveform 202 emitted by the light source 57. The output waveform 202 comprises a train of light pulses 204 with a nominal pulse height represented by some voltage V0. In the embodiment shown, these pulses comprise square waves with an ON period 206 of W1, an OFF period 208 of W2, and a total period of W3=W1+W2. In a particularly preferred embodiment W1=W2 for a 50% ON-time duty cycle, though it is possible to have other duty cycles, as well.

Figure 6B:
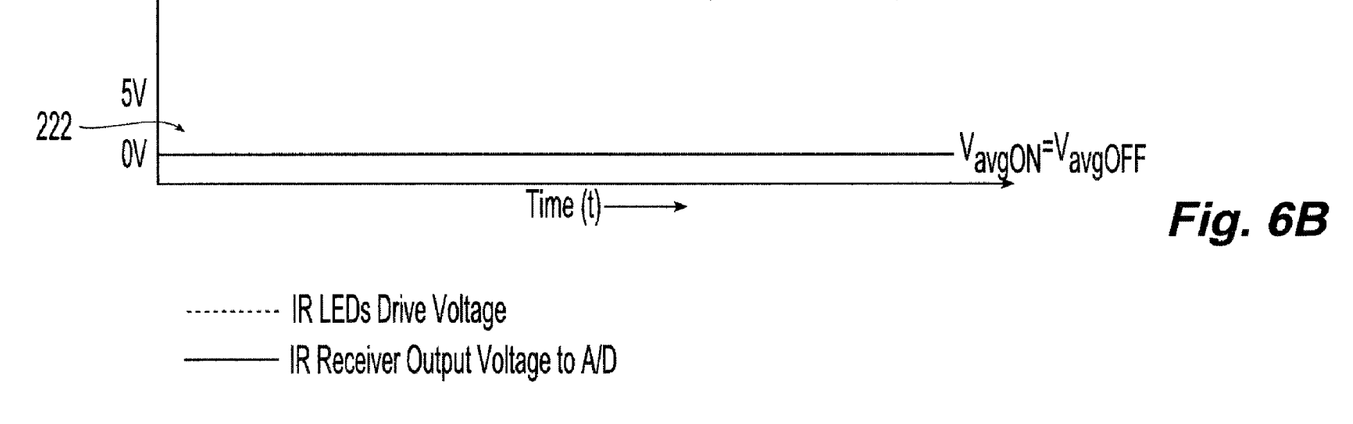

FIG. 6B shows an ideal waveform 222 output by the light detector 58 (i.e., the received light) when no ULD is covering the PDU. In the absence of an object, e.g., an ULD, covering the PDU 28, the emitted light pulses 240 are not reflected off of the bottom surface of that object, and so no light energy (i.e., 0 volts) should be received at the light detector 58, whose output is therefore flat. In reality, however, there may be some small amount of ambient light of the appropriate wavelength, such as 'bleed' from the light source 57, that impinges on the light detector 58, thus resulting in minimal received light energy. However, this minimal received light energy is generally below some threshold value and therefore is ignored by the processor 72.

Figure 7A:
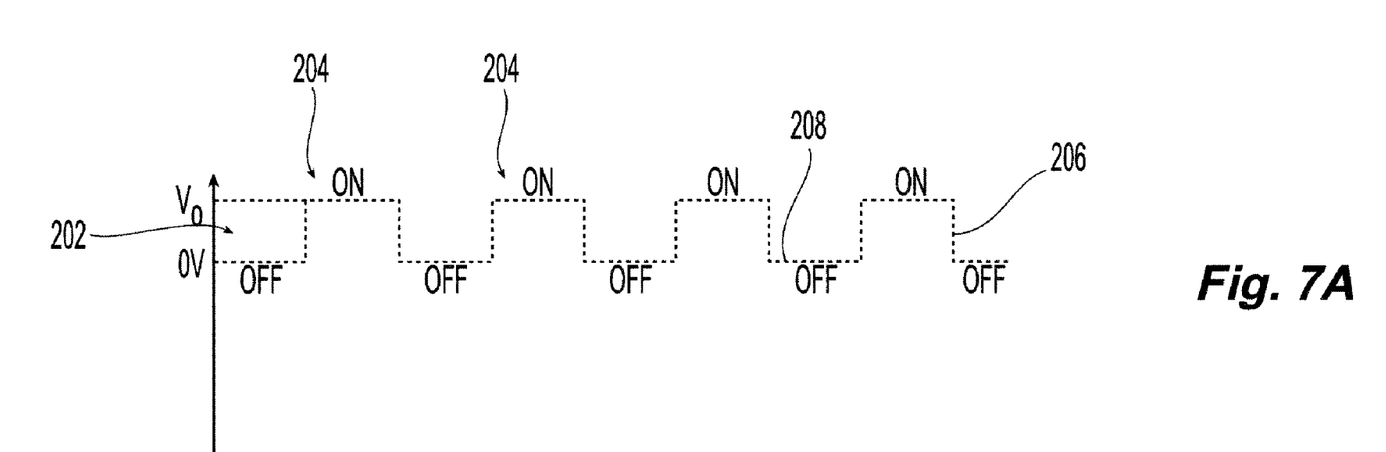
FIG. 7A shows an ideal waveform comprising a train of light pulses and FIG. 7B shows an ideal output for when a stationary ULD covers the PDU.
Figure 7B:
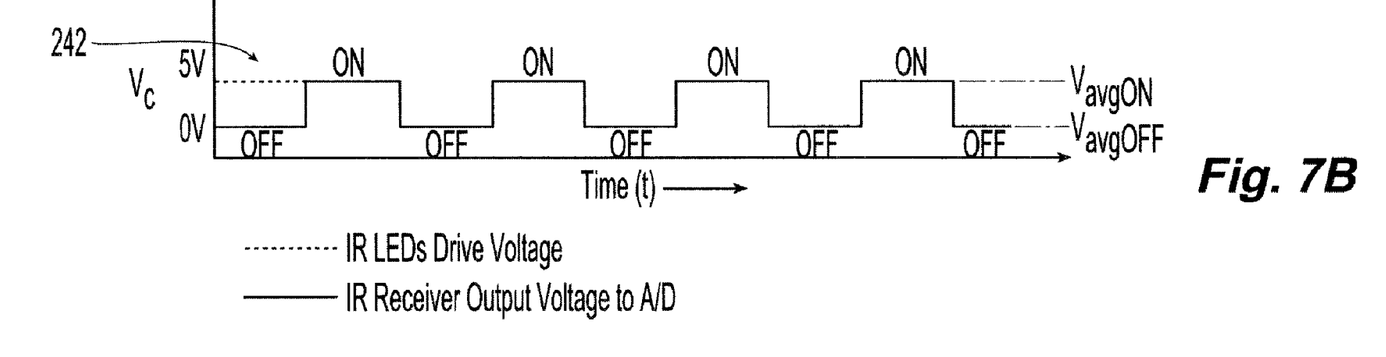

FIG. 7A shows the same ideal output waveform 202 seen in FIG. 6 while FIG. 7B shows, for comparison, an ideal waveform 242 output by the light detector 58 when a stationary object is covering the PDU 28. When a stationary object such as an ULD covers the PDU 28, the emitted light pulses 240 are reflected off of the bottom surface of that object and the reflected light energy is received at the light detector 58. The output of the detector 58 is representative of the time-varying intensity of the reflected light. However, since the object is stationary, ideally, the detector output will perfectly track the emitted waveform, with the intensity of detected light on the output side of the detector 58 being represented by some voltage value Vc.

Figure 8A:
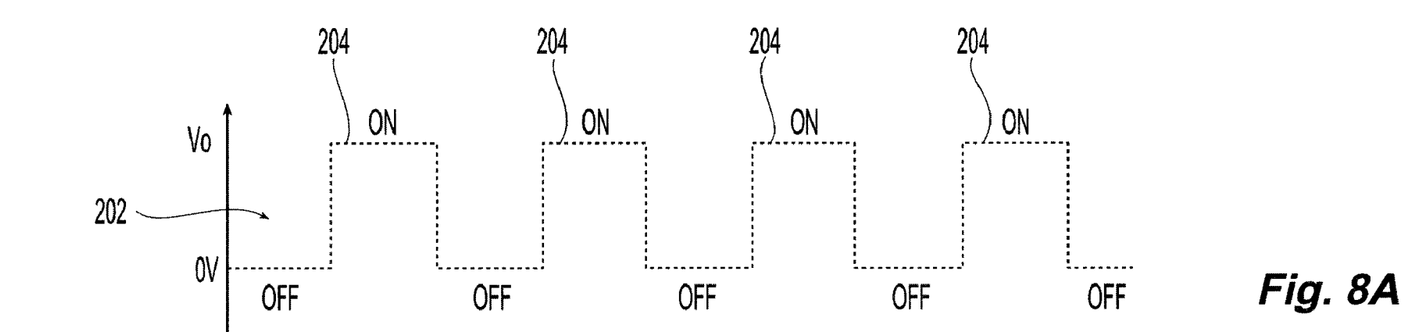
FIG. 8A shows an ideal waveform comprising a train of light pulses and FIG. 8B shows two received pulses representative of a stationary ULD and two other received pulses representative of a moving ULD.
Figure 8B:
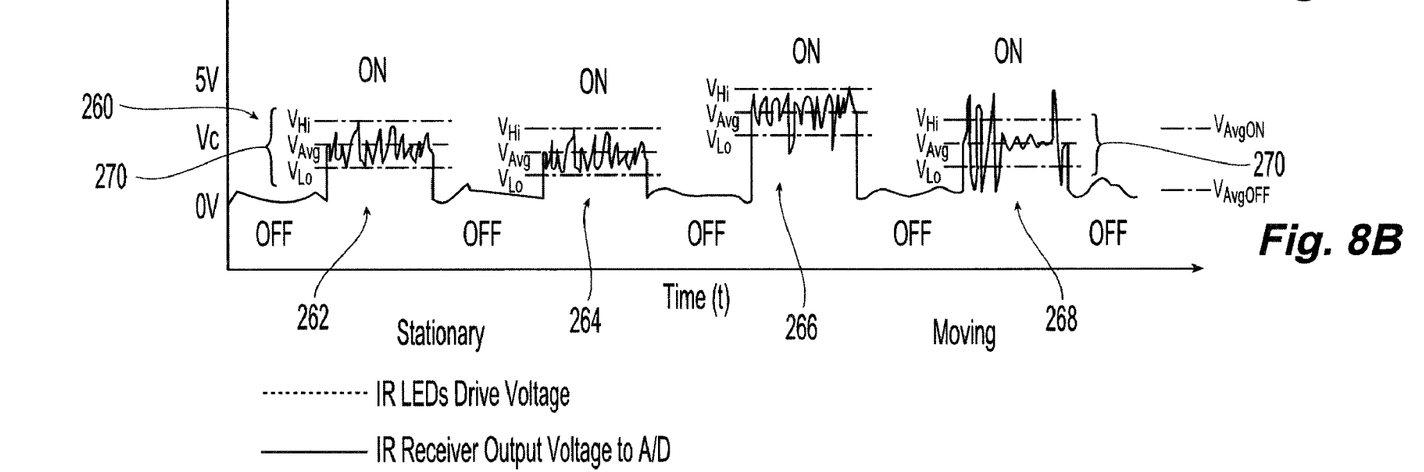

FIGS. 8A and 8B also correspond to the situation in which an ULD covers the PDU 28, but shows more realistic, non-ideal output. FIG. 8A shows the same ideal output waveform 202 seen in FIGS. 6 and 7. FIG. 8B shows a waveform 260 comprising four pulses of detected light. In this instance, the ULD is initially stationary during the first two pulses 262, 264, and then is in motion during the last two pulses 266, 268.

Figure 8C:
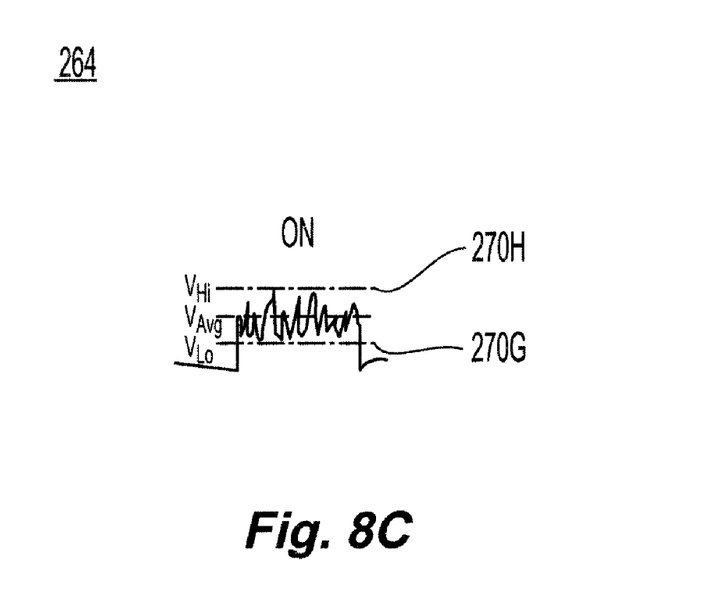
FIG. 8C shows a detailed view of a pulse from FIG. 8B that is representative of a stationary ULD and FIG. 8D shows a detailed view of a pulse from FIG. 8B that is representative of a moving ULD.

When the ULD is stationary, the detected pulses 262, 264 have intensity values that are all confined in a narrow band defined 270 between $V_{LO}$ and $V_{HI}$. This is because the emitted waveform 202 impinges on the same location on the underside of the ULD, and so the reflected light is substantially unaffected by variations in the surface of the underside of the ULD. FIG. 8C shows a magnified view of the detected pulse 264 and shows that all intensity values within the pulse 264 are between the lower limit 270L and the upper limit 270H of the band.

Figure 8D:
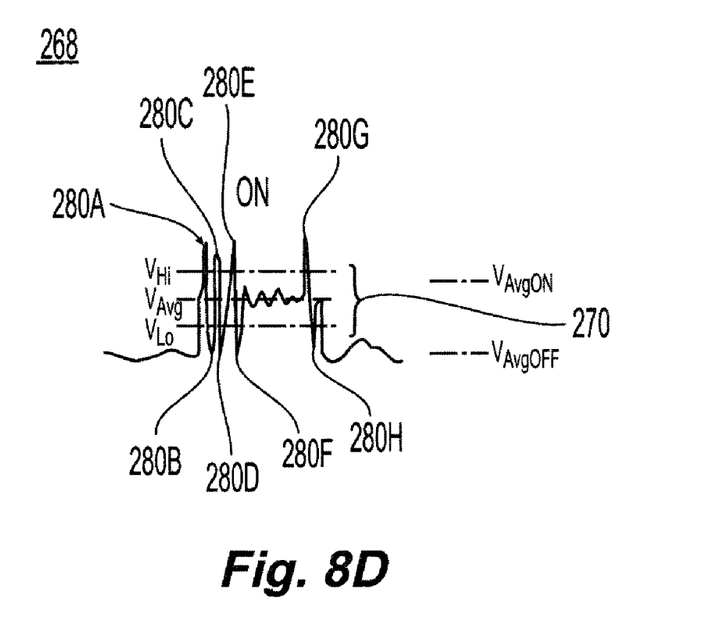

In contrast, when the ULD is in motion, the detected pulses 266, 268 have intensity values that go outside this band 270 from time to time. This happens because as the ULD moves, different portions of its underside pass over the PDU 28, and variations in the surface of the underside cause corresponding variations the instantaneous intensity of the reflected pulses. Generally speaking, at least some of these instantaneous sample values go outside the band 270. FIG. 8D shows a magnified view of the detected pulse 267 and shows that some of received intensity values, designated 280A-H are outside the band 270. Digital sample values which fall outside the band 270 are referred to as "spikes".

In one embodiment, the processor, which dictates when the light source 57 emits pulses, only processes samples received from the A/D converter 70 when the light source 57 is emitting a pulse. For instance, the processor 72 may begin to accept samples from the A/D converter 70 when the light source 57 is energized and discontinue accepting samples when the light source 57 finishes emitting a pulse 204, or perhaps some very short predetermined time thereafter. This cycle is then repeated for the next pulse. In another embodiment, the processor 72 continuously accepts and processes samples from the A/D converter 70, and employs an algorithm to detect pulses, such as by looking for a rising pulse edge, in a known manner. For an A/D sample rate of 200 samples/sec, and a pulse width of 0.25 second, in the case where the processor 72 only processes samples when the light emitter is outputting light pulse 204, roughly 100 samples are taken per ON/OFF cycle. It is within these 50 or so digital samples during which the light source is on that, in one embodiment of the present invention, the processor 72 looks for spikes.

Figure 9A:
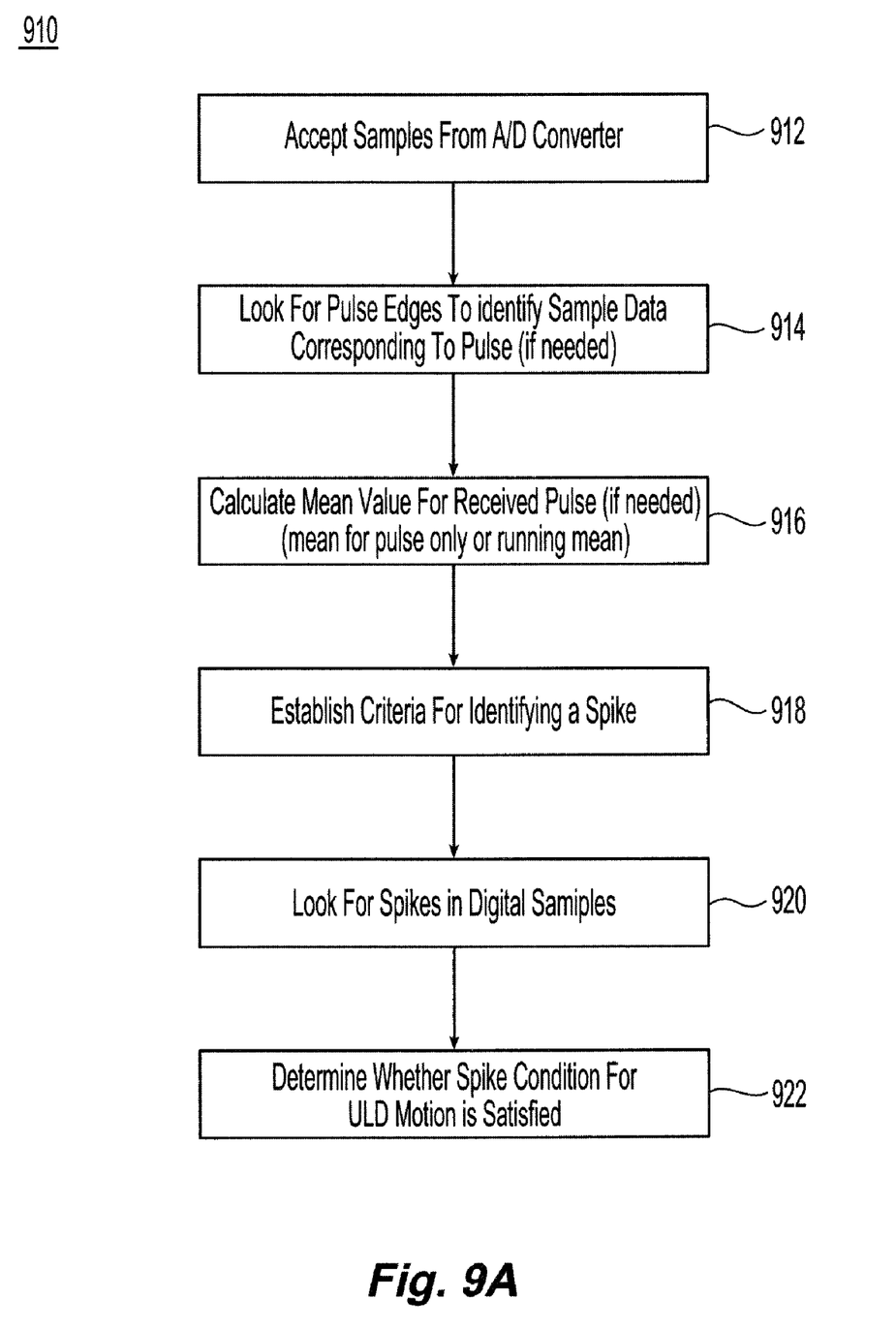
FIG. 9A shows a process flow diagram for one embodiment of how the processor can determine whether there is ULD motion using spikes in the received data.
Figure 9B:
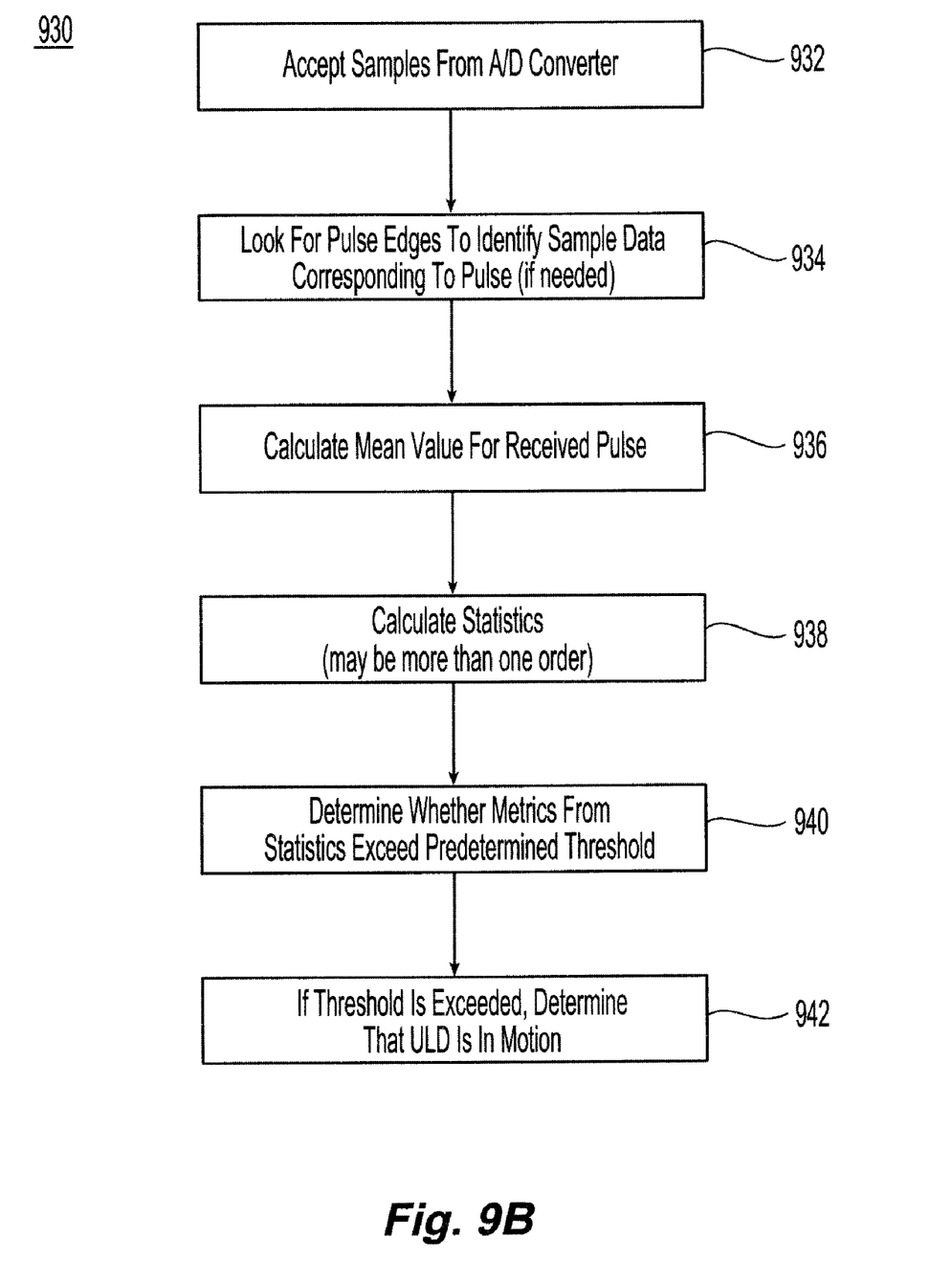
FIG. 9B shows a process flow diagram for a second embodiment of how the processor can determine whether there is ULD motion using statistics of the received samples.

FIGS. 9A and 9B depict two general flow diagrams 910, 930, respectively, illustrating the functionality performed by PDU 28 in order to determine whether an ULD is in motion, in accordance with two general embodiments of the present invention. In both embodiments, the functionality is preferably implemented by software stored in memory 74 and executed by processor 72. In other embodiments, the functionality can be performed by hardware, or any combination of hardware and software.

In the general embodiment represented by FIG. 9A, the flow diagram 910 depicts the principal steps carried out by the processor 72 in looking for spikes in a received pulse.

In step 912, the processor 72 accepts digital samples from the A/D converter 70.

In step 914, the processor looks for pulse edges so that it can focus on the pulse data, rather than on data corresponding to where no pulse is present.

In step 916, the processor 72 calculates a mean for the digital samples within the received pulse. In some embodiments, the mean may constitute a running mean which is calculated based on digital samples from earlier returned pulses and also digital samples from a current pulse. A new running mean may be calculated from a weighted average of a current running mean and newly acquired digital samples. In one embodiment, the digital samples are de-meaned prior to further processing, though this is not an absolute requirement. It is noted that for some embodiments, however, the mean may not need to be calculated to identify spikes.

In step 918, the processor 72 establishes the criteria of determining spikes. In one embodiment, this can entail establishing the band 270. Digital samples falling outside this band are deemed to be spikes. The band 270 can be established in a number of ways. For instance, the band 270 may be determined by using a threshold value based on predetermined fraction or percentage of the mean. Thus, if a predetermined fraction of 1/16 (i.e., for a predetermined percentage of 6.25%) is used, then the threshold value T1 would be 1/16 of the mean and the band 270 would straddle either side of the mean by 1/16 of that mean value. Other predetermined fractions or percentages may be used instead. Alternatively, the threshold value T1 may be determined through other heuristics. Regardless of how the band is established, in this embodiment, spikes are defined as those values that vary from the mean by at least T1, i.e. $V_{HI}$=Mean+T1 and $V_{LO}$=Mean−T1.

In another embodiment discussed below, a spike is found to be present if the values of two digital samples within a window differ by some minimum threshold T2.

In step 920, the processor 72 performs calculations on the digital samples, looking for spikes.

Finally, in step 920, the processor 72 determines whether the spikes collectively meet the requisite criteria for the PDU 28 to determine that the ULD is in motion.

A number of different criteria may be employed to determine whether or not the ULD is in motion.

In one embodiment, the ULD is deemed to be moving only if at least one received pulse contains an integer number K spikes, where K is at least 1. In another embodiment, the ULD is deemed to be moving only if two or more successive pulses each contain at least K spikes.

In still another embodiment, a 'voting' system may be used in which the ULD is deemed to be in motion only if a first integer number X out of a second integer number Y successive received pulses each contain at least K spikes.

In still another embodiment, the ULD is deemed to be moving only if at least K digital samples within at least one pulse differ from the mean value for the digital samples by at least a first threshold. In one variation, a "local" mean value based on a first number of digital samples falling within a window of, e.g., 20 samples, may be used for this purpose, and a number windows within a pulse may be studied. The windows may be overlapping, such as having a 50% overlap. Whether or not a local mean value is used, in a further refinement, the ULD may only be deemed to be moving if at least one digital sample is greater than the mean value and another digital sample is below the mean value. In other words, at least one digital sample must fall on either side of the band, before it is determined that the ULD is in motion. In some embodiments of this approach when windows are used, once K such "outliers" are identified, the remainder of the pulse is not processed, since the criterion has been met for deciding that the ULD is in motion.

In yet another embodiment, the criterion for finding a spike is that at least one digital sample differs from another digital sample within a received pulse by at least some threshold value. Again, both digital samples may be required to fall within the same window. For example, the processor may use a window of, say, 15 samples and determine whether two samples within that window differ from each other by at least some threshold value T2. If so, it is determined that a spike exists in the window, and thus, in the received pulse. This calculation is then performed for a number of such (possibly overlapping) windows along the received pulse. If at least K such spikes are identified in the pulse, then it is decided that the ULD is in motion. Again, in some embodiments of this approach using windows, once K such spikes are identified, the remainder of the pulse is not processed, since the criterion has been met for deciding that the ULD is in motion. Also, in this embodiment, since one is simply trying to determine whether two digital samples within a window have values that differ by the threshold T2, it is not necessary to first calculate the mean or de-mean the digital samples.

In any of the above embodiments, the precise number for K generally will be determined through trial runs and testing where the ULD is known to be in motion. Thus, it is possible that K can be any integer number, such as 1, 2, 3, or even more.

In the general embodiment represented by FIG. 9B, the flow diagram 930 depicts the principal steps carried out by the processor 72 to employ second order statistics to determine whether a received pulse indicates motion of an ULD.

In step 932, the processor 72 accepts digital samples from the A/D converter 70.

In step 934, the processor 72 looks for pulse edges so that it can focus on the pulse data, rather than on data corresponding to where no pulse is present.

In step 936, the processor 72 calculates a mean for the digital samples within the received pulse. Again, in some embodiments, the mean may constitute a running mean which is calculated based on digital samples from earlier returned pulses and also digital samples from a current pulse. A new running mean may be calculated from a weighted average of a current running mean and newly acquired digital samples In step 938, the processor 72 calculates one or more statistics for a pulse using the mean that was calculated in step 936. In one embodiment, the statistics may be of the general form:

$$P_n = \frac{1}{M} \sum_{i=1}^{M} |X_i - X_0|^n$$

where: $P_n$ is the calculated $n^{th}$ order statistic that is compared against some corresponding threshold value $T3_n$; i is an index, M is the number of samples from the pulse (e.g., M=50) that are used to calculate a given statistic; $X_i$ is the value of the $i^{th}$ digital sample in the pulse (or window within a pulse); $X_0$ is the mean (whether it is the mean for that pulse or a moving average); and n is the order of the statistics and so corresponds to the power to which the absolute value of the difference $(X_i-X_0)$ is taken.

It is understood that first, second, third, fourth, or even higher order statistics may be taken. It is also understood that a decision may be made based on a single statistic of a single order, or on a vector comprising a plurality of statistics of different orders, in which instance a corresponding plurality of thresholds $\{T3_n\}$ may be established. Finally, it is also understood that in other embodiments, statistics other than those represented by the general formula above may be taken. Regardless of which statistic(s) is/(are) used, they may be calculated either on a received-pulse-by-received pulse basis, or for each of a plurality of (possibly overlapping) windows within a single pulse. For each such window (or for the entire pulse, if so calculated), the processor determines whether each corresponding statistic exceeds some predetermined threshold $T3_n$. If so, it is then determined that the ULD is moving.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of detecting motion of an unit load device in a cargo hold of an aircraft, comprising:
   providing a floor of the cargo hold of an aircraft with a power drive unit having a motor, at least one driver roller element coupled to said motor, a light source, a light detector, and a processor having a memory associated therewith for storing instructions;
   emitting, with the light source, a plurality of pulses of light in a direction of an underside of an unit load device, when an unit load device is over the power drive unit;
   detecting, with the light detector, light reflected from the underside of the unit load device;
   sampling the detected light to form a time series of digital samples, each digital sample representative of an intensity of reflected light; and
   performing calculations on a plurality of said digital samples to determine whether the unit load device is moving, wherein:
   said calculations include at least one from the group consisting of:
   (a) determining the number of spikes among the digital samples; and
   (b) taking at least one statistic of the digital samples and comparing said at least one statistic with a corresponding at least one threshold.

2. The method according to claim 1, comprising:
   deciding that the unit load device is moving, only if at least one received pulse contains at least an integer number K spikes.

3. The method according to claim 2, comprising:
   deciding that the unit load device is moving, only if two or more successive received pulses each contain at least K spikes.

4. The method according to claim 2, comprising:
   deciding that the unit load device is moving, only if a first integer number X out of a second integer number Y successive received pulses each contain at least K spikes, wherein $Y \geq X$.

5. The method according to claim 2, comprising:
   calculating a mean value of a plurality of the digital samples;
   deciding that the unit load device is moving, only if at least K digital samples from at least one received pulse differ from said mean value by at least a first threshold.

6. The method according to claim 5, wherein:
   at least one digital sample is greater than the mean value; and
   at least one other digital sample is less than the mean value.

7. The method according to claim 2, comprising:
   for at least one received pulse, calculating a difference between one digital sample within the pulse, and each of a plurality of other digital samples within that same pulse; and
   deciding that the unit load device is moving, only if at least K digital samples differ from said one digital sample by at least a first threshold.

8. The method according to claim 7, wherein:
   fewer than all of the other digital samples within that same pulse are compared with said one digital sample.

9. The method according to claim 2, wherein K is 2.

10. The method according to claim 1, comprising:
    calculating at least one first order statistic; and
    deciding that said unit load device is in motion, only if said at least one first order statistic exceeds a first threshold.

11. The method according to claim 1, comprising:
    calculating at least one second order statistic; and
    deciding that said unit load device is in motion, only if said at least one second order statistic exceeds a first threshold.

12. The method according to claim 1, comprising:
    calculating a plurality of statistics, each statistic belonging to a different order; and
    deciding that said unit load device is in motion, only if each of said plurality of statistics exceeds a corresponding threshold.

13. The method according to claim 1, wherein said step of performing calculations on a plurality of said digital samples comprises performing said calculations on a plurality of said digital samples present in each of a plurality of windows belonging to at least one received pulse.

14. An air cargo power drive unit comprising:
    a motor, at least one driver roller element coupled to said motor, a light source, a light detector, and a processor having a memory associated therewith for storing instructions that, when executed by said processor, cause the processor to:
    cause the light source to emit a plurality of pulses of light in a direction of an underside of an unit load device, when an unit load device is located over the power drive unit;
    obtain a time series of digital samples, each digital sample representative of an intensity of light reflected from an underside surface of an unit load device and detected by the light detector, when an unit load device is located over the power drive unit; and
    perform calculations on a plurality of said digital samples to determine whether the unit load device is moving, wherein
    said calculations include at least one from the group consisting of:
    (a) determining the number of spikes among the digital samples; and
    (b) taking at least one statistic of the digital samples and comparing said at least one statistic with a corresponding at least one threshold.

15. The air cargo power drive unit according to claim 14, wherein the instructions further cause the processor to:
 decide that the unit load device is moving, only if at least one received pulse contains at least an integer number K spikes.

16. The air cargo power drive unit according to claim 15, wherein the instructions cause the processor to:
 decide that the unit load device is moving, only if two or more successive received pulses each contain at least K spikes.

17. The air cargo power drive unit according to claim 15, wherein the instructions cause the processor to:
 decide that the unit load device is moving, only if a first integer number X out of a Second integer number Y successive received pulses each contain at least K spikes, wherein $Y \geq X$.

18. The air cargo power drive unit according to claim 15, wherein the instructions cause the processor to:
 for at least one received pulse, calculate a mean value of a plurality of the digital samples; and
 decide that the unit load device is moving, only if at least K digital samples from said at least one received pulse differ from said mean value by at least a first threshold.

19. The air cargo power drive unit according to claim 15, wherein the instructions cause the processor to:
 decide that the unit load device is moving only if:
 at least one digital sample is greater than the mean value; and
 at least one other digital sample is less than the mean value.

20. The air cargo power drive unit according to claim 15, wherein the instructions cause the processor to:
 calculate a difference between one digital sample within the pulse, and each of a plurality of other digital samples within that same pulse; and
 decide that the unit load device is moving, only if at least K digital samples differ from said one digital sample by at least a first threshold.

21. The air cargo power drive unit according to claim 15, wherein the instructions cause the processor to:
 compare fewer than all of the other digital samples within that same pulse, with said one digital sample.

22. The air cargo power drive unit according to claim 15, wherein the instructions require that K equal 2.

23. The air cargo power drive unit according to claim 14, wherein the instructions cause the processor to:
 calculate at least one first order statistic; and
 decide that said unit load device is in motion, only if said at least one first order statistic exceeds a first threshold.

24. The air cargo power drive unit according to claim 14, wherein the instructions cause the processor to:
 calculate at least one second order statistic; and
 decide that said unit load device is in motion, only if said at least one second order statistic exceeds a first threshold.

25. The air cargo power drive unit according to claim 14, wherein the instructions cause the processor to:
 calculate a plurality of statistics, each statistic belonging to a different order; and decide that said unit load device is in motion, only if each of said plurality of statistics exceeds a corresponding threshold.

26. The air cargo power drive unit according to claim 14, wherein the instructions cause the processor to:
 perform calculations on a plurality of said digital samples present in each of a plurality of windows belonging to at least one received pulse.

27. A cargo aircraft having an air cargo loading system including at least one power drive unit, the at least one power drive unit having an unit load device overhead, said at least one power drive unit comprising:
 a motor, at least one driver roller element coupled to said motor, a light source, a light detector, and a processor having a memory associated therewith for storing instructions that, when executed by said processor, cause the processor to:
 cause the light source to emit a plurality of pulses of light in a direction of an underside of the unit load device;
 obtain a time series of digital samples, each digital sample representative of an intensity of light reflected from an underside of an unit load device and detected by the light detector; and
 perform calculations on a plurality of said digital samples to determine whether the unit load device is moving; wherein
 said calculations include at least one from the group consisting of:
 (a) determining the number of spikes among the digital samples; and
 (b) taking at least one statistic of the digital samples and comparing said at least one statistic with a corresponding at least one threshold.

28. The cargo aircraft according to claim 27, wherein the instructions cause the processor to:
 perform calculations on a plurality of said digital samples present in each of a plurality of windows belonging to at least one received pulse.

* * * * *